Dec. 2, 1930.  G. H. EMERSON ET AL  1,783,705
RAILWAY CAR WHEEL
Filed March 23, 1929

A.R.A.

Inventors
George H. Emerson
John J. Tatum
By Edwin S. Clarkson
Attorney

Patented Dec. 2, 1930

1,783,705

UNITED STATES PATENT OFFICE

GEORGE H. EMERSON AND JOHN J. TATUM, OF BALTIMORE, MARYLAND

RAILWAY-CAR WHEEL

Application filed March 23, 1929. Serial No. 349,420.

Figure 3:
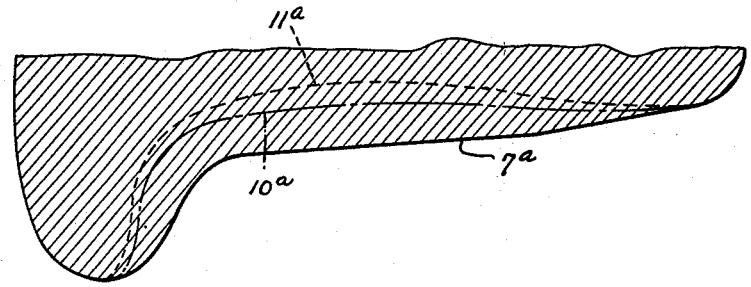

Figure 3 is a similar view of the A. R. A. flange and tread.

Figure 4:
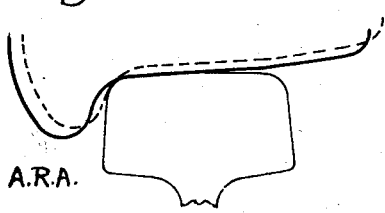

Figure 4 is an accurate end elevation of a standard railroad rail with a standard A. R. A. wheel flange and tread mounted thereon.

The object of our invention is to have the vital or important parts of the flange and wheel fit and of the same contour as the rail to the extent that practice would result in one engaging the other.

The reference numeral 4 designates a rail of standard type commonly used on railroads. The wheel 5 is provided with a flange 6 and a tread 7 embodying our invention.

Figure 2:
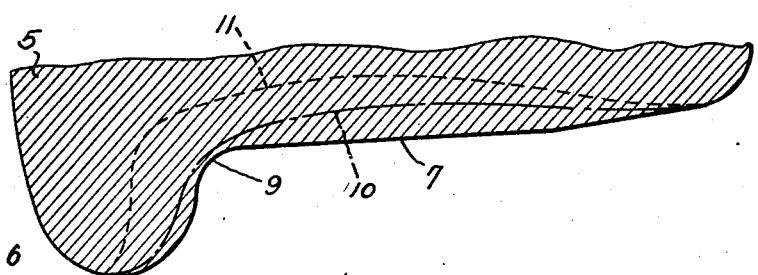
Figure 2 is a detail sectional view of our improved flange and tread.

It will be noted in comparing Figures 2 and 3 that we in our improved construction shown in Figure 2 have changed to a greater angle the rail engaging surfaces of the wheel or tire, as comparted with the A. R. A. standard, so that our improved tread has the same contour as the rail from the base to the top of the throat of the flange, and has the taper of the head of the rail from the top of the throat of the flange to approximately the center of the rail head. This taper on the wheel extends to approximately the same width as the head of the rail, after which the taper changes to a greater angle as at 8.

The idea of changing to a greater angle at the outer run of the wheel, or tire of a wheel, is for the purpose of preventing heavy loads from coming upon the outer edge of the wheel, or outer edge of the tire when the wheel is rolling through frogs of the track and the points of the frogs are worn to a more or less extent. When frog points are worn and the tread of the wheel is straight, or of a straight taper, a heavy blow by contact with the frog 10 is imparted to the outer edge of the wheel, which results in such outer edge, commonly known as the rim, of the wheel being broken off. Our change in the taper of the wheel avoids this.

We do not consider it practical to provide a wheel, or a tire of a wheel that will fit the entire head of the rail, or the side of a rail. Should such a wheel be made use of it would result in wearing a groove in the tread of the wheel approximately, or greater than, the width of the rail, which is objectionable. Should the flange be made to fit the side of the head of the rail its entire depth it would soon result in what is known as a vertical flange, and the wheel would have to be removed from service on account of its being unsafe, as the pressure of the flange against the side of the rail would be so great that it would be possible for the wheel to ride up over the rail.

Figure 1:
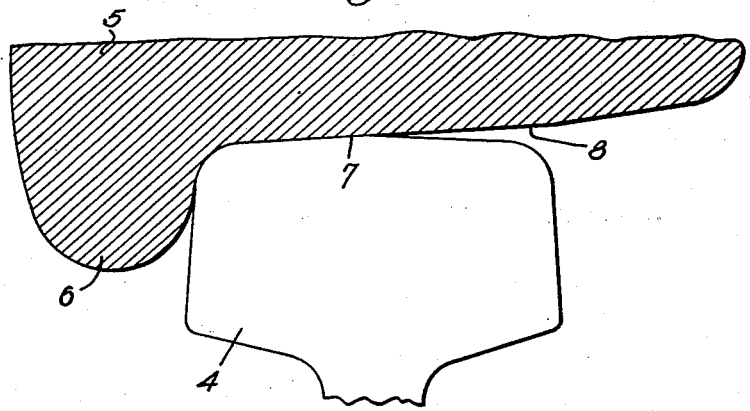
Figure 1 is an accurate end elevation of a standard railway rail on which our new wheel is mounted, and shown in section, the flange and tread of the wheel only being shown.

To eliminate this objection we provide a wheel or tread of such design (as illustrated) that it will have the same lines as the rail at the throat of the flange, and on the tread of the wheel up to approximately the center of the rail head. Our design of flange throat 9 and the wheel tread 7 insures longer life of the wheel flange, longer life of the wheel tread, greater life of the head of the rail, at the bearing of the throat of the wheel flange, and longer life of the rail at the bearing of the tread, from the center line of the rail head to the throat of the flange. A still further advantage resulting from the taper on the wheel tread shown in Figures 1 and 2, that of having the wheel as it rotates, keep the throat of the flange away from the head of the rail, which has the tendency to increase the life of the throat of the flange and insure a longer life of the flange with greater safety. The tread of the wheel, may, if desired, be made of only one taper, but we prefer the shape shown.

The wear on the flange throat, rim, and tread can be readily understood in connection with Figures 2 and 3 of the drawing to which we will now specifically refer.

The chart illustrations in Figures 2 and 3 were made by a standard gage used for measuring wheel flanges and treads, and the tests illustrated were made with two pairs of wheels in the rear truck of an engine tender, the difference in the tread and flange wear, according to Figures 2 and 3, were taken after a mileage of about 60,000 miles in actual service. One pair of wheels was made up of wheels according to Figure 2 embodying our invention, and the other pair was made of the wheels according to Figure 3 which is the standard A. R. A. wheel.

After a test mileage run in actual service of our improved wheel the tread 7, flange throat and flange wore to the contour indicated by the broken line 10, while the dotted line 11, indicates the A. R. A. and I. C. C. condemning limit of a wheel. It will thus be seen from Figure 2 that after being in service for approximately 60,000 miles the tread, flange throat, and flange wear does not make an appreciable advance toward the condemning wear line 11. Particular attention is called to the fact that in the flange throat 9 the wear is almost negligible, so that the normal strength of the flange at the throat is for all practical purposes always preserved which is an extremely important item from the standpoint of safety.

We will now refer to the chart illustration of Figure 3 showing the standard A. R. A. wheel run in the test above referred to.

In Figure 3 the full line 7a designates the original contour of the tread flange and flange throat. The dotted line 11a designates the A. R. A. and I. C. C. condemning limit. After this A. R. A. wheel had run approximately 60,000 miles in the test above referred to the original contour of tread, flange, and flange throat had worn away to the contour designated by the broken line 10a. Particular attention is called to the dangerously close approach of the line 10a to the condemnation line 11a, especially in the flange and flange throat, and it is to be noted here for comparison the comparatively negligible wear in our flange and flange throat shown in Figure 2.

From the above it will be seen that the relation of the tread of the wheel, and the throat of the flange to the rail on which it rolls is the primary object of our invention, regardless of the design of the wheel.

As will be seen, the greatest diameter of the tread of our wheel is at the beginning of the curve on the throat of the flange. The diameter is reduced at the center and further reduced toward the outer edge of the wheel.

It will also be noted that at the throat of the flange, the flange immediately at the base of the round edge of the rail curves outwardly and downwardly away from the side of the rail head.

According to our experiments we find that our contour of tread and flange throat fits the rail and the rail fits that contour, thereby insuring greater life to the wheel and rail, for the reason that it reduces to a minimum breakage in flanges, thus the railroad will be saved thousands of dollars in the purchase of new wheels and tires for locomotives and cars, and a like savings in the purchase of new rails. In our wheel there is more metal through the throat of the flange than has heretofore been used at that point.

It, of course, is understood that according to our invention we may re-form by machining the treads on existing wheels and tires to conform with our invention as disclosed in this case.

What we claim is:

1. As a new article of manufacture, a flanged car wheel having a tread of the same contour at the throat of the flange as the inner rounded corner of the rail head and tapered from said throat at an angle corresponding to the taper of the head of such rail to a point coinciding approximately with the center of the rail head.

2. As a new article of manufacture, a flanged car wheel having a tread of the same contour at the throat of the flange as the inner rounded corner of the rail head and tapered from said throat at an angle corresponding to the taper of the head of such rail to a point coinciding approximately with the center of the rail head and thence tapered at a greater angle toward the outer edge of the wheel.

3. As a new article of manufacture, a car wheel having a flange throat adapted to closely fit the round corner edge of a rail, the flange immediately at a point opposite the end of said round corner of the rail being curved outwardly from the throat.

4. As a new article of manufacture, a car wheel having a flange throat of the same contour as and coextensive with and engaging the rounded edge corner of the head of a rail, the inner face of the flange being curved outwardly below said edge.

5. As a new article of manufacture, a flanged car wheel having a tread of the same contour at the throat of the flange as the rounded inner edge of a standard rail and tapering from said throat to the outside edge of the wheel.

6. A locomotive or car wheel, or a tire for a wheel, having formed thereon a tread and a flange of the same contour as the rail on which it rolls between the inner side of the rail at the base of the rounded inner edge of the rail and the longitudinal center of the wheel tread.

7. A wheel, or a tire for a wheel, having a flange, the throat of which is of a contour to bear on the inner side and tread of the head of the rail from the base to the top of the inner rounded edge of said head.

8. A wheel, or a tire for a wheel, having a flanged tread of a contour to bear against the inner side and tread surface of the head of the rail between the base of the curve of the rounded inner edge of the head to the longitudinal center of the tread surface of said head.

In testimony whereof we affix our signatures.

GEORGE H. EMERSON.
JOHN J. TATUM.